United States Patent [19]

Seragnoli

[11] 4,305,317

[45] Dec. 15, 1981

[54] FEED AND CUTTING DEVICE FOR DIVIDING A CONTINUOUS WEB INTO PORTIONS

[75] Inventor: Enzo Seragnoli, Bologna, Italy

[73] Assignee: G.D. Societa per Azioni, Bologna, Italy

[21] Appl. No.: 93,593

[22] Filed: Nov. 13, 1979

[30] Foreign Application Priority Data

Nov. 14, 1978 [IT] Italy ................................ 3592 A/78

[51] Int. Cl.[3] ...................... B23D 25/12; B23D 33/02; B23D 33/12

[52] U.S. Cl. ........................................ 83/336; 83/246; 83/260; 83/251; 83/100

[58] Field of Search ................. 83/246, 260, 202, 408, 83/345, 251, 336

[56] References Cited

U.S. PATENT DOCUMENTS

| | | | |
|---|---|---|---|
| 345,052 | 7/1886 | Harrison | 83/246 X |
| 979,406 | 12/1910 | Armstrong | 83/260 X |
| 2,546,221 | 3/1951 | Funk | 83/336 X |
| 2,633,193 | 3/1953 | Thompson | 83/246 X |
| 2,725,101 | 11/1955 | Von Hope | 83/251 |
| 3,192,807 | 7/1965 | Haselow et al. | 83/100 X |

*Primary Examiner*—Donald R. Schran
*Attorney, Agent, or Firm*—Frost & Jacobs

[57] ABSTRACT

A feed and cutting device for dividing a continuous web into portions is described. The device comprises along a feed plane, guiding device for the web comprising a pair of mutually tangential rollers, apparatus for feeding the web along said plane and a device for cutting the web into portions. The main feature of the device is that at least one of the guide rollers is mounted on a shaft coaxial thereto and rotating with continuous motion, and is connected to the shaft by a self-locking device which prohibits any discordant relative rotation between the roller and the shaft but which allows idle rotation of the roller on the shaft at an angular speed exceeding the angular speed of the shaft, the angular speed of the shaft being close to but less than the angular speed transmitted to the respective roller by the feed device by way of said web.

7 Claims, 4 Drawing Figures

FEED AND CUTTING DEVICE FOR DIVIDING A CONTINUOUS WEB INTO PORTIONS

BACKGROUND OF THE INVENTION

This invention relates to a feed and cutting device for dividing a continuous web into portions, and more precisely a device of the aforesaid type able to operate with great reliability even at the very high operating speeds of the most modern wrapping and packaging machines.

A device of this type is particularly suitable in those cases in which, for reasons of accuracy, the cutting operation has to be preceded by a web adjustment operation. This is the case for example when removing, from a continuous web, portions or sheets comprising a printed motif on their surface.

In this respect, it is well known that the distance between the centres of such printed motifs on a continuous web is not exactly constant for various reasons deriving from the actual printing process, from the variation in the tension to which the web is subjected during its unwinding, and from variations in ambient conditions which can cause it to contract or elongate.

For these reasons, when a web printed on one or both of its faces has to be divided into portions, each cutting operation is of necessity preceded by an adjustment operation.

The final result is portions having a length which is not precisely constant, and which carry on their surface printed motifs which are perfectly centred.

In known devices, feed means drive the web with an intermittent movement along a plane known as the feed plane.

The web is adjusted relative to the cutting means when the feed means are in their rest or halt stage.

The means proposed for this purpose can either be electrical or mechanical, and operate in combination with reference marks (colour marks, holes, slots) applied to the web during the printing, at the same distance apart as the printed motifs.

After this adjustment, the operational cycle of these devices is concluded by a portion or sheet being separated, this being done by cutting means disposed downstream of said feed means.

Upstream of and in proximity to said feed means, guide means for the web are normally provided along the feed plane, these being constituted for example by fixed means or by a pair of idle rollers. The purpose of these rollers is to ensure that the web is controlled, in particular when the feed means are in their inactive or halt stage, and during the adjustment operation.

The drawbacks of such devices of known type include the cyclic variations in the tension to which the web is subjected due to the alternation of the active and the inactive or halt stages of the feed means.

Beyond determined operational speeds of the device, and particularly when using delicate materials, these variations in tension can cause tearing of the web. Such tearing is greatly facilitated in the case of webs in which transverse slots have been formed to act as the reference marks for mechanical adjustment means.

In this respect, the transverse slots represent lines of weakness at which preferential tearing occurs.

A further drawback of the devices of known type is the possibility of the web sliding or slipping on the feed rollers, with consequent loss of the correct phase setting between the cutting means and web.

In such an event, it is often necessary to halt the device and manually adjust in order to reset the correct operating conditions. If it occurs at the commencement of the drive stage, the cause of said slippage is mainly due to the variations in the tension to which the web is subjected.

However, other causes include high operating speeds, wear of the feed roller surfaces and slackness arising between these rollers and their support means.

SUMMARY OF THE INVENTION

The object of the present invention is to provide a feed and cutting device able to obviate the various drawbacks of known devices, and in particular a device which practically annuls any variations in the tension to which the web is subjected during the described operations, and consequently eliminates the causes of tearing and one of the causes of said slippage.

A further object of the present invention is to provide a device of the aforesaid type provided with means able to automatically and instantaneously operate when slippage occurs due to the various causes described, so as to render its consequences negligible. Within the scope of the preceding objects, a further object of the present invention is to provide a device in which, in combination with the aforesaid means, adjustment means of mechanical type are provided which are extremely reliable and simple, and are able to carry out the adjustment operation without damaging the web. These and further objects are all attained by the feed and cutting device for dividing a continuous web into portions, comprising, from upstream to downstream along a plane known as the feed plane, means for guiding the web along said plane and constituted by a pair of mutually tangential rollers, means for feeding the web along said plane and means for cutting the web into portions, wherein at least one of said guide rollers is mounted on a shaft coaxial thereto and rotating with continuous motion, and is connected to said shaft by a self-locking device which prohibits any discordant relative rotation between said roller and said shaft but which allows idle rotation of said roller on said shaft at an angular speed exceeding the angular speed of said shaft, the angular speed of said shaft being close to but less than the angular speed transmitted to the respective roller by said feed means by way of said web.

BRIEF DESCRIPTION OF THE DRAWINGS

Further characteristics and advantages will be more apparent from the detailed description given hereinafter of two embodiments of the device according to the invention, illustrated by way of non-limiting example in the accompanying drawings in which.

DETAILED DESCRIPTION OF THE INVENTION

Figure 1:
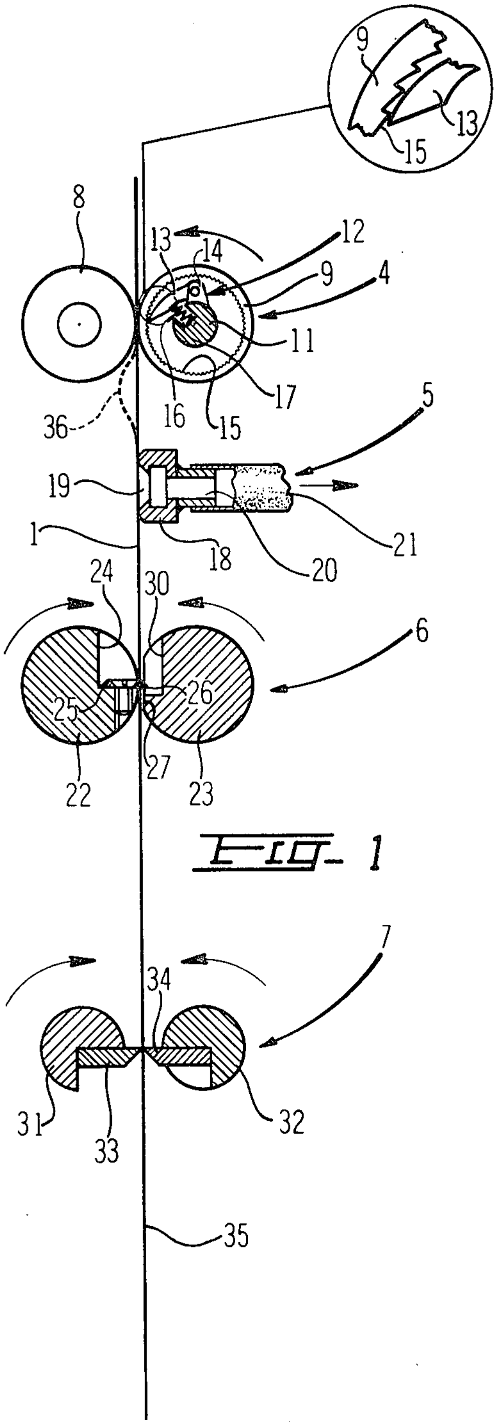
FIG. 1 is a partly sectional side view of a first embodiment of the device according to the present invention.
Figure 2:
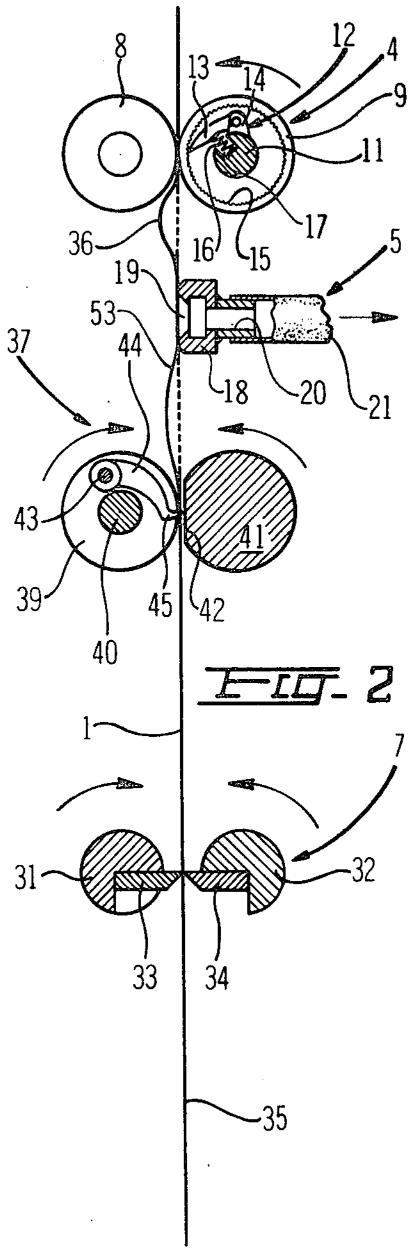
FIG. 2 is a partly sectional side view of a second embodiment of the device according to the present invention.
Figure 3:
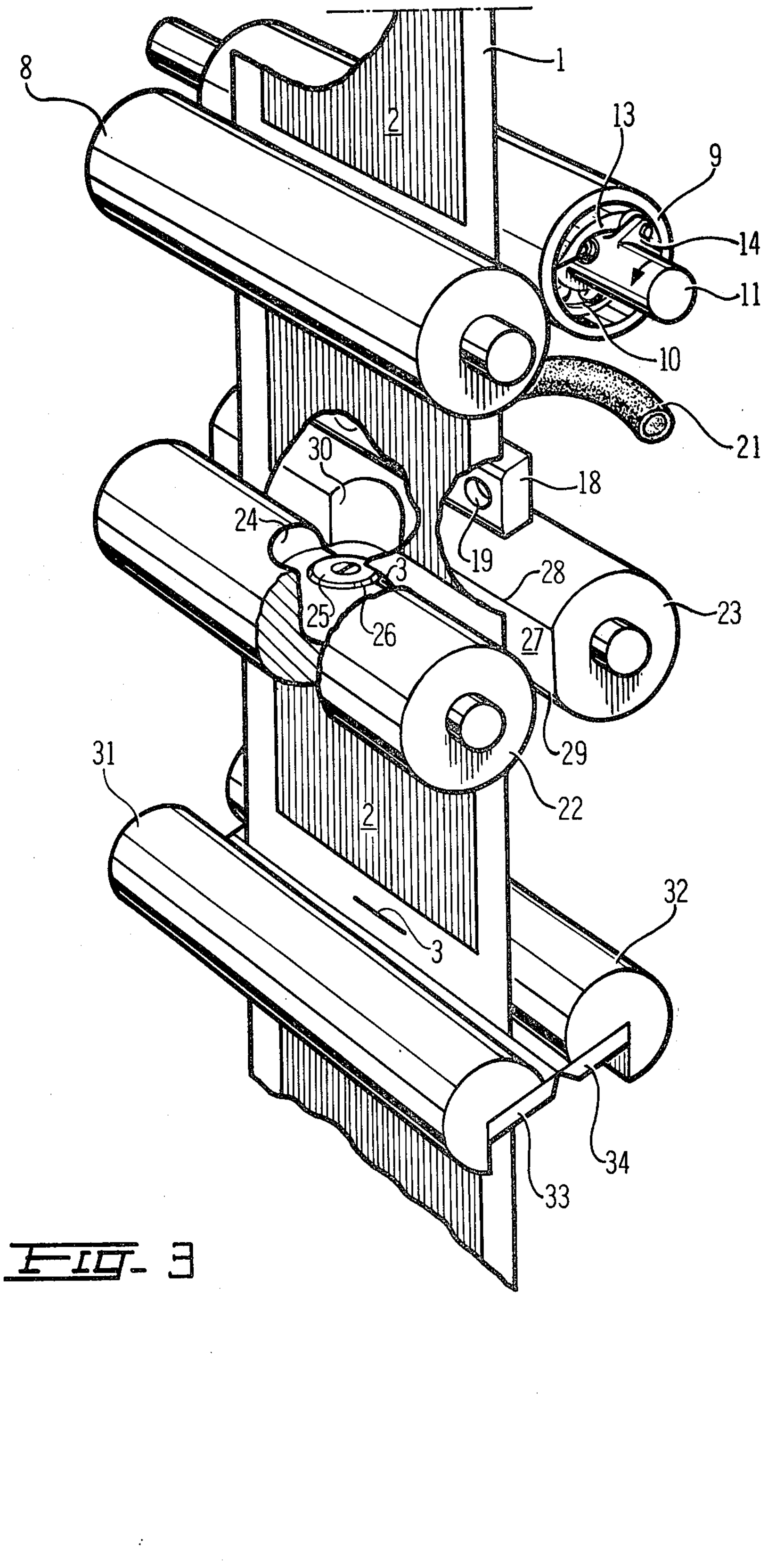
FIG. 3 is a perspective view of said first embodiment of the device according to the present invention, with certain parts shown in section or removed in order to give greater clarity to others.

FIGS. 1 to 3 show a web 1 which is unwound from a spool, not shown, along a vertical plane known as the feed plane.

The web 1, to be divided into individual sheets or portions, is provided on the visible face in FIG. 3 with a succession of printed motifs 2 (indicated diagrammatically by dashed rectangles) with transverse slots 3 therebetween, formed in known manner during the printing operation.

The slots 3 are used in the manner described hereinafter in order to centre said printed motifs 2 relative to each portion. From the top downwards along the path of the web 1 there are disposed web guide means indicated overall by 4, braking means (defined hereinafter simply as brake) indicated by 5, feed and adjustment means indicated overall by 6, and cutting means indicated by 7.

All said means are supported by the frame of the device concerned, in a manner not shown.

Said guide means comprise a pair of rollers rotatably mounted about horizontal axes, and which are mutually tangential in the web feed plane and indicated from left to right by the numbers 8 and 9.

In particular, the roller 9 is mounted on a shaft 11 by way of bearings 10 (only one of which is partly shown in FIG. 3). The shaft 11 is provided at its end with drive means, not shown, to rotate it continuously in an anticlockwise direction, and is connected to the roller 9 by a self-locking device indicated overall by 12. This device consists essentially of a pawl or stop tooth 13, pivoted at one end to a radial appendix 14 of the shaft 11, and a sawtoothed rim 15 provided on the inside of the roller 9. For clarity, the stop tooth 13 and rim 15 are also partly shown in FIG. 1 to a greater scale.

The free end of the stop tooth 13 is brought into engagement with the rim 15 by the pressing action of a spring 16 housed in a cavity 17 in the shaft 11.

The device 12, of conventional type, opposes any relative rotation in a discordant direction between the shaft 11 and roller 9, but allows the roller 9 to rotate idly on said shaft 11 in the same direction as it, i.e. in the anticlockwise direction.

It is apparent that this latter condition arises if the roller 9 is rotated about its axis with an angular speed exceeding that of the shaft 11.

Other self-locking devices of known type (for example comprising rollers) can obviously replace that described.

The brake 5 is constituted by a substantially parallelepiped bar 18 disposed parallel to the shaft 11 and adhering to the feed plane, to the right of it.

That face of the bar 18 which faces said feed plane is provided with a series of horizontally aligned bores 19 which open into a duct 20 connected by a tube 21 to a source of suction, not shown.

Said feed and adjustment means 6 comprise a pair of rollers of equal radius with their axes parallel to the axes of the rollers 8 and 9, and indicated from left to right by 22 and 23. The rollers 22 and 23, designed to drive the web 1 downwards along said feed plane, are rotated at the same speed by drive means, not shown.

For reasons which will be apparent hereinafter, the peripheral speed of the rollers 22 and 23 is close to but greater than the peripheral speed of the roller 9, which is rotated by the shaft 11 by way of the self-locking device 12.

A disc 25 is fixed in a substantially radial position to the roller 22 in a cavity 24 formed in the central region thereof. The disc 25, which forms part of said adjustment means, is provided with a cutting edge 26 and is sized such that it extends for a suitable distance beyond the cylindrical surface of the roller 22.

The roller 23 is provided with a bevel or flattened portion 27 lying between generating lines or edges indicated by 28 and 29 (from the top downwards in FIG. 3) and interrupted in its central region by a recess 30.

The mutual arrangement or phase-setting of the rollers 22 and 23 is as shown in FIGS. 1 and 3.

In this respect, when the flattened portion 27 of the roller 23 is parallel to the feed plane of the web 1, the disc 25 lies in a horizontal plane, and projects beyond said feed plane at the recess 30.

From the aforegoing description, it is apparent that for each 360° of rotation of the rollers 22 and 23, a stage in which they make contact with or grip the web 1 and a stage in which they release the web 1 occur, these stages alternating.

The second stage occurs as the flattened portion 27 reaches the line of tangency between the roller 22 and the feed plane. Finally, it should be noted that the development of the cylindrical surface of the roller 23 between the generating lines 28 and 29 is such as to drag a length of web which is almost equal to but slightly less than the length of a portion.

The cutting means 7 comprise two rollers 31 and 32 of equal diameter with their axes parallel to the axes of the aforesaid rollers, and rotating in opposite directions at the same frequency as the feed rollers 22 and 23.

Blades 33 and 34 are mounted on the rollers 31 and 32 respectively, and are sized such that they make mutual contact along the feed plane of the web 1, in order to separate portions or sheets indicated by 35.

The operation of the device according to the present invention will now be considered, starting from the state shown in FIGS. 1 and 3.

In these figures, the two blades 33 and 34 are in their cutting position, and the rollers 22 and 23, between which the web 1 is in its released state, are in the position in which the disc 25 lies in a substantially horizontal plane.

The web 1 is also adjusted along the feed plane such that the disc 25 is inserted in a transverse slot 3 (see FIG. 3).

On rotating the rollers 22 and 23, the web 1 is firstly dragged by the disc 25 until it leaves the slot 3.

From the moment in which the edge 28 of the flattened portion 27 reaches the feed plane, the web is driven by the rollers 22 and 23.

When the gripping stage of the rollers 22 and 23 ends, i.e. when the edge 29 becomes removed from the feed plane, a length of web has been unwound which is approximately equal to but less than the length of a portion 35, i.e. the distance between two adjacent slots 3.

As a consequence of this, the slot 3 following the one just considered becomes positioned, when the web halts, downstream of and close to the contact line between the roller 22 and web 1. During the disengagement stage between the rollers 22 and 23, the dragging of the length of web which is to constitute the individual portion is completed, and at the same time the adjustment operation is carried out. This is done by the disc 25, of which the cutting edge 26 slides in contact with the web 1 as the roller 22 rotates, until it becomes inserted into the slot 3.

At the moment in which the disc 25 assumes a substantially horizontal position, the cutting device 7 closes and a portion 35 is separated from the web.

It should be noted that the blades 33 and 34 can cut either in a position coinciding with the slot 3, or spaced apart from it as shown in FIG. 3.

The operation of the rollers 8 and 9 during the course of the described operations will now be considered.

During the stage of contact between the rollers 22 and 23, the two rollers 8 and 9 rotate idly about their respective axes, dragged by the web 1, a described heretofore.

During this stage, the rollers 8 and 9 simply guide and retain the web 1.

On termination of contact between the rollers 22 and 23, and consequently when the rollers 8 and 9 cease to be dragged by the web 1, the shaft 11 rotates the roller 9 by way of the self-locking device 12, and the roller 8 becomes correspondingly rotated by friction.

This generally means that whenever there is any deficiency in the dragging action of the rollers 22 and 23, these become automatically replaced by the rollers 8 and 9.

The action of these, which as stated have a peripheral speed close to but less than that of the rollers 22 and 23, gives rise to a bend 36 in the web 1 (represented by a dashed line in FIG. 1) within the length lying between the rollers 8 and 9 and the brake 5.

Even during this stage, the length of web 1 between the brake 5 and rollers 22 and 23 maintains an ideal tension for the adjustment operation by the disc 25.

The bend 36 becomes gradually less, until it disappears during the adjustment stage, and on the return to contact of the rollers 22 and 23.

Figure 4:
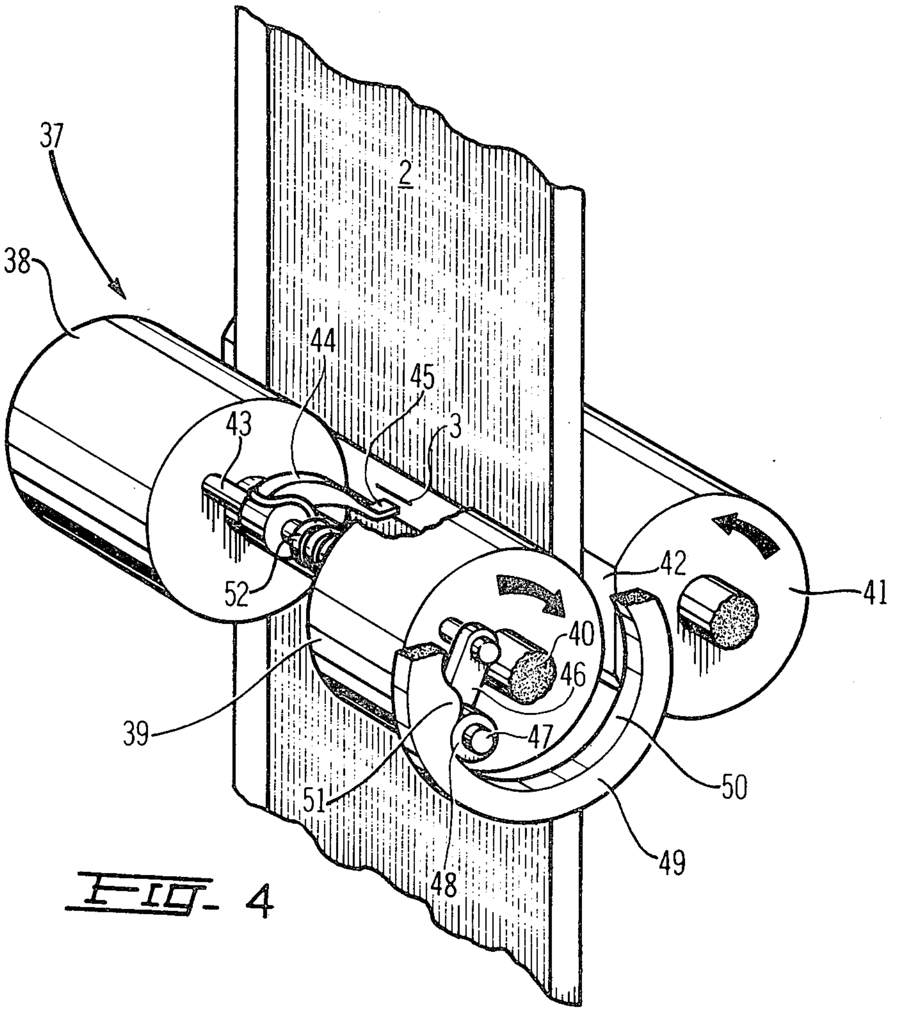
FIG. 4 is a perspective view of a detail of said second embodiment of the device according to the invention, with certain parts shown in section or removed in order to give greater clarity to others.

FIGS. 2 and 4 show a second embodiment of the device according to the present invention. This embodiment differs from the first only with regard to the feed and adjustment means, indicated overall by 37.

The roller 22 of FIGS. 1 and 3 is divided into two separate rollers 38 and 39 spaced apart by a suitable distance on a shaft 40, and cooperating with a roller 41 corresponding to the roller 23 and also provided, as this latter, with a flattened portion indicated by 42. The rollers 38, 39 and 41, which are driven in known manner, intermittently drive the web 1 by means of a gripping stage and a release stage which alternate with each other during each 360° rotation.

As in the case of the rollers 22 and 23, the peripheral speed of the rollers 38, 39 and 41 is approximately equal to but greater than the peripheral speed of the roller 9, which is rotated by the shaft 11 by way of the device 12, and in this second embodiment the feed rollers unwind a length of web, for each 360° of rotation, which is approximately equal to but greater than the length of one portion.

The two rollers 38, 39 are traversed eccentrically by a pin 43 parallel to the shaft 40, and supported by them so that it can rotate about its axis. In the region between the rollers 38 and 39, a curved arm 44 is pivoted on the pin 43 in a plane normal to the shaft 40 and is provided at its free end with a tooth 45.

The pin 43 is provided at the end which emerges from the roller 39, with a lever 46 extending normal to it.

An idle roller 48 is mounted at the free end of the lever 46 on a pin 47 parallel to the pin 43.

To the right of the roller 39, there is provided a fixed cam constituted by an annular element 49 which is fixed to the frame of the device concerned, coaxially to the rollers 38 and 39.

The annular element 49 defines internally a circular track 50 interrupted by a projection 51, and along which the idle roller 48 rolls as the rollers 38 and 39, and consequently the pin 43, roll.

On the pin 43 there is wound a spring 52 fixed at its two ends to the arm 44 and to the roller 39 respectively.

The spring 52, which tends to cause the pin 43 and lever 46 to rotate with respect to the rollers 38, 39 in a clockwise direction (with reference to FIG. 4), ensures adherence between the roller 48 and annular element 49.

As the roller 48 runs along the circular track 50, the arm 44 occupies a withdrawn or rest position, maintaining its end or tooth 45 at a distance from the shaft 40 which is not greater than the radius of the rollers 38, 39.

Engagement between the roller 48 and projection 51 occurs, as shown in FIG. 4, during disengagement between the roller 41 and the rollers 38, 39, when the tooth 45 slides in proximity to the feed plane of the web 1.

More precisely, as the roller 48 rises on the projection 51, the arm 44 undergoes an anticlockwise rotation, so as to cause the tooth 45 to project beyond said feed plane. The two movements which the arm 44 undergoes during this stage, i.e. its clockwise rotation about the shaft 40 and its anticlockwise rotation about the pin 43, combine to produce a movement of the tooth 45 from the bottom upwards along the feed plane, provided the projection 51 is suitably shaped.

During the subsequent descent stage, the arm 44 rotates in a clockwise direction to return to its original rest position. The operation of the second embodiment of the device will now be considered, assuming a similar initial position to that already described, i.e. in which the blades 33 and 34 are cutting a portion 35.

During this stage, the flattened portion 42 of the roller 41 is disposed in a substantially vertical plane facing the feed plane of the web 1, and the roller 48 is close to the summit of the projection 51.

The web 1 is adjusted along said plane such that the tooth 45 is inserted in a slot 3.

As the two rollers 38 and 39 rotate, the arm 44 rotates clockwise, as stated, to disengage the tooth 45 from the slot 3.

At the moment of this disengagement, and with the restoration of contact between the roller 41 and rollers 38, 39, the web drive stage begins, at the end of which a length of web has been unwound which is approximately equal to but greater than the length of a portion 35.

As a consequence of this, during the next disengagement stage, the slot 3 immediately upstream of that previously considered is disposed, when in the halt state, downstream of and in proximity to the line of contact between the rollers 38, 39 and the web 1. On engagement between the roller 48 and projection 51, the tooth 45 slides from the bottom upwards along the web 1, which is in the halted state, and becomes inserted into the slot 3. The curved arm 44, which in this manner is coupled to the web 1, adjusts it by dragging it from the bottom upwards. A portion 35 is removed by virtue of the blades 33 and 34 during the rise of the roller 48 towards the summit of the projection 51. It will be noted that in this second embodiment, the web 1 undergoes not only the already mentioned flexion 36 caused by the rollers 8 and 9, but also a second flexion 53 lying between the brake 5 and rollers 38, 39 and 41 generated by the arm 44 during the adjustment operation.

Both these flexions are reabsorbed during the next web drive stage exercised by the rollers 38, 39 and 41.

The aforegoing description shows that the device according to the present invention obviates the drawbacks of known devices, and therefore attains the stated objects.

As stated, during the cyclic disengagement stages of the feed rollers, the web 1 is driven by the rollers 8 and 9, which are driven by the shaft 11 by way of the device 12.

Because of the minimum peripheral speed difference between the rollers 8 and 9 and the rollers 22 and 23 (38, 39 and 41), the web 1 runs with a practically constant speed until close to the feed rollers and during the course of the entire operating cycle, and in all cases without undergoing damaging tension variations. The case will also be considered in which the dragging action of the rollers 22 and 23 (38, 39 and 41) becomes interrupted or is slowed down because of slippage.

In this event there is immediate and automatic operation of the rollers 8 and 9.

This operation prevents the web 1 from being subjected to damaging stresses, and at the same time by causing reduction in the tension of the web in the region between the rollers 8 and 9 and the feed rollers, facilitates the restoration of adhesion between these and the web, and thus the immediate restoration of the normal operating conditions.

From the aforegoing description of the adjustment operation, it will be noted that the web 1 is subjected to very low stresses during the various operating stages of the device, even at very high speeds.

Finally, the device according to the invention is particularly suitable for feeding printed webs of delicate material and dividing them into portions.

What I claim is:

1. A feed and cutting device for dividing a continuous web into portions, comprising, from upstream to downstream along a plane known as the feed plane, means for guiding the web along said plane and constituted by a pair of mutually tangential rollers, means for feeding the web along said plane and means for cutting the web into portions, at least one of said guide rollers being mounted on a shaft coaxial thereto and rotating with continuous motion, and being connected to said shaft by a self-locking device which prohibits any discordant relative rotation between said guide roller and said shaft but which allows idle rotation of said guide roller on said shaft at an angular speed exceeding the angular speed of said shaft, the angular speed of said shaft being close to but less than the angular speed transmitted to the respective guide roller by said feed means by way of said web, said feed means operating with intermittent action, such that during each period of intermittent action they drag lengths of web having a length approximately equal to the length of said portions, means for adjusting said web with respect to said cutting means and which cooperate with reference marks provided on the web, the adjusting means operating within the time interval between the unwiding of two successive lengths of web by said feed means.

2. A device as claimed in claim 1, including braking means in said feed plane, disposed between said guide means and said feed means, said braking means comprising suction means acting on the web.

3. A device as claimed in claim 1, wherein said feed means comprise a pair of feed rollers rotating with continuous motion in opposite directions, and disposed on opposite sides of said feed plane and mutually tangential in said plane, at least one of said feed rollers being provided with a bevel or flattened portion extending parallel to its axis, such that during each rotational cycle, and with respect to said plane, one contact or gripping stage for dragging the web alternates with one disengagement state from said web.

4. A device as claimed in claim 3 wherein said adjustment means comprise mechanical means mounted on one of said feed rollers, and provided with an edge or tooth arranged for insertion into transverse slots constituting said reference marks provided on the web during each disengagement stage of said feed rollers.

5. A device as claimed in claim 4, wherein said web feed rollers are sized such that during their contact stage they unwind a length of web approximately equal to but less than the length of a portion, said adjustment means being rigid with and rotating with one of said rollers and having said tooth extending beyond the periphery of its respective roller.

6. A device as claimed in claim 4 wherein said web feed rollers are sized such that during their contact stage they unwind a length of web approximately equal to but greater than the length of a portion, said adjustment means comprising an arm pivoted on a pin supported eccentrically and rotatably by one of said feed rollers and parallel to the axis of said last mentioned feed roller, said arm having a free end terminating in said tooth, and fixed cam means arranged to impress on said pin and said arm, during the course of said disengagement stage, a rotational movement in the opposite direction to the rotation of said last mentioned feed roller.

7. A device as claimed in claim 1, wherein said self-locking device is of the type comprising a pawl or stop tooth, and a sawtoothed rim on the inside surface of said respective guide roller.

* * * * *